US008735818B2

(12) United States Patent
Kovtoun et al.

(10) Patent No.: US 8,735,818 B2
(45) Date of Patent: May 27, 2014

(54) DISCRETE DYNODE DETECTOR WITH DYNAMIC GAIN CONTROL

(75) Inventors: Viatcheslav V. Kovtoun, Santa Clara, CA (US); Raman Mathur, Mountain View, CA (US)

(73) Assignee: Thermo Finnigan LLC, San Jose, CA (US)

( * ) Notice: Subject to any disclaimer, the term of this patent is extended or adjusted under 35 U.S.C. 154(b) by 1031 days.

(21) Appl. No.: 12/751,084

(22) Filed: Mar. 31, 2010

(65) Prior Publication Data

US 2011/0240857 A1 Oct. 6, 2011

(51) Int. Cl.
*H01J 43/18* (2006.01)
*H01J 43/04* (2006.01)
*H01J 43/24* (2006.01)

(52) U.S. Cl.
CPC ................ *H01J 43/04* (2013.01); *H01J 43/18* (2013.01); *H01J 43/24* (2013.01)
USPC ...................................................... 250/336.1

(58) Field of Classification Search
CPC ......... H01J 49/025; H01J 49/40; H01J 43/04; H01J 43/24; H01J 43/18; H01J 43/06
USPC ...................................................... 250/336.1
See application file for complete search history.

(56) References Cited

U.S. PATENT DOCUMENTS 3,003,065 A 10/1961 Ketchledge
3,614,646 A 10/1971 Hansen
3,898,452 A 8/1975 Hertel
4,590,368 A 5/1986 Govaert
4,804,891 A 2/1989 Sweeney
4,820,914 A 4/1989 Allen
5,367,222 A 11/1994 Binkley
5,440,115 A 8/1995 Bauco et al.
5,525,794 A 6/1996 Gibbons
5,616,987 A 4/1997 Ohmura et al.
6,747,271 B2 6/2004 Gonin et al.
6,756,587 B1 6/2004 Bateman et al.
6,841,936 B2 1/2005 Keller et al.
7,238,936 B2 7/2007 Okamura et al.
7,579,575 B2 8/2009 Yatokoro
2007/0040096 A1 2/2007 Kato et al.
2009/0127994 A1 5/2009 Hosea et al.

OTHER PUBLICATIONS

Gibson et al., "Rejuvenation of Channel Electron Multipliers," J. Phys. E: Sci. Instrum., vol. 17, 1984.

*Primary Examiner* — Marcus Taningco
(74) *Attorney, Agent, or Firm* — Michael C. Staggs

(57) ABSTRACT

A novel electron multiplier that regulates in real time the gain of downstream dynodes as the instrument receives input signals is introduced. In particular, the methods, electron multiplier structures, and coupled control circuits of the present invention enable a resultant on the fly control signal to be generated upon receiving a predetermined threshold detection signal so as to enable the voltage regulation of one or more downstream dynodes near the output of the device. Accordingly, such a novel design, as presented herein, prevents the dynodes near the output of the instrument from being exposed to deleterious current pulses that can accelerate the aging process of the dynode structures that are essential to the device.

16 Claims, 2 Drawing Sheets

DISCRETE DYNODE DETECTOR WITH DYNAMIC GAIN CONTROL

BACKGROUND OF THE INVENTION

1. Field of the Invention

The present invention relates to the field of particle detector instrumentation. More particularly, the present invention relates to electron multipliers wherein real time signal generated by an intermediate dynode is monitored to regulate in real time the gain to dynodes near the output of the instrument.

2. Discussion of the Related Art

Electron multipliers are often utilized as detectors for the detection of particles such as photons, neutral molecules, and/or ions provided by mass spectrometry. While the geometry of such devices can vary, a common beneficial design comprises a cathode, an anode, and a chain of resistors and capacitors coupled to a plurality of about 10-25 discrete electron multiplier disposed structures (dynodes). Collectively, such an arrangement provides a plurality of stages that when operated with voltages between about 1000-5000V enable gains often between about than $10^5$ up to about $10^7$. Beneficially, the dynode (discrete) geometry and operating parameters is often utilized as part of an ion detector when configured to operate with mass analyzers, such as, but not limited to mass filters, ion traps, and time of flight mass spectrometers where significant variation of ion flux is common when operating in various scanning modes or when recording time transients.

The potential difference between a pair of dynodes is often designed so that an electron striking a dynode can produce more than one secondary electron. The average number of secondary electrons per primary electron produced at a particular dynode is the gain of that stage of the electron multiplier with the gain of the entire electron multiplier being the product of the gain at every stage from the cathode to the last dynode. Increasing the voltage applied to the electron multiplier typically increases the voltage between dynodes, increasing the gain of each stage, thereby increasing the gain of the entire multiplier. Operating these detectors with high gain is desired for the detection of low-level signals in order to improve signal-to-noise ratio. However, such high gain values and thus high secondary fluxes result in intense electron currents in the final stages of the current amplification along the various dynode structures. While the use of discrete dynode architecture allows for better control of individual dynodes in the final part of the chain, the beneficial design still cannot in total prevent strong electron currents from hitting dynodes near the output of the device.

One of the primary reasons for aging when utilizing discrete dynode electron multipliers is the carbon deposition on the surface of one or more dynodes which are adjacent the anode of the instrument. The accumulation of excessive carbon deposition has been attributed to the higher doses per unit area of secondary electrons from the dynodes near the anode that enable a carbon to become bonded to the dynode surfaces, which reduces the secondary yield. As part of the phenomenon, the deleterious buildup of carbon occurs more rapidly in poor vacuum conditions, most typical of ion trap instruments. Those of ordinary skill in the art have applied approaches to resolve this issue to include: 1) lowering the background pressure to reduce the carbon buildup; 2) increasing the active surface area of the dynodes under electron impact; and 3) disassembly of the dynodes structures to clean and/or refurbish the device. However, while such approaches have been shown to somewhat ameliorate the aging process of the dynode structures, they are often not always desirable because of the technical challenges and associated costs.

Background information for an electron multiplier that limits the response of the instrument when subjected to a large input signal for an initial period of time, is described and claimed in, U.S. Pat. No. 6,841,936, entitled, "FAST RECOVERY ELECTRON MULTIPLIER," issued Jan. 11, 2005, to Keller et al., including the following, "[a]n improved electron multiplier bias network that limits the response of the multiplier when the multiplier is faced with very large input signals, but then permits the multiplier to recover quickly following the large input signal. In one aspect, this invention provides an electron multiplier, having a cathode that emits electrons in response to receiving a particle, wherein the particle is one of a charged particle, a neutral particle, or a photon; an ordered chain of dynodes wherein each dynode receives electrons from a preceding dynode and emits a larger number of electrons to be received by the next dynode in the chain, wherein the first dynode of the ordered chain of dynodes receives electrons emitted by the cathode; an anode that collects the electrons emitted by the last dynode of the ordered chain of dynodes; a biasing system that biases each dynode of the ordered chain of dynodes to a specific potential; a set of charge reservoirs, wherein each charge reservoir of the set of charge reservoirs is connected with one of the dynodes of the ordered chain of dynodes; and an isolating element placed between one of the dynodes and its corresponding charge reservoir, where the isolating element is configured to control the response of the electron multiplier when the multiplier receives a large input signal, so as to permit the multiplier to enter into and exit from saturation in a controlled and rapid manner."

Background information for a photomultiplier detector that includes a gain control circuit to provide feedback to a dynode situated near the anode, is described and claimed in, U.S. Pat. No. 5,367,222, entitled, "REMOTE GAIN CONTROL CIRCUIT FOR PHOTOMULTIPLIER TUBES," issued Nov. 22, 1994, to David M. Binkley, including the following, "[a] gain control circuit (10) for remotely controlling the gain of a photomultiplier tube (PMT (12)). The remote gain control circuit (10) may be used with a PMT (12) having any selected number of dynodes (DY). The remote gain control circuit (10) is connected to the last dynode nearest the anode (16) in the dynode string which controls the total dynode supply voltage and influences the gain of each dynode (DY). The remote gain control circuit (10) of the present invention includes an integrated-circuit operational amplifier (U1), a high-voltage transistor (Q1), a plurality of resistors (R), a plurality of capacitors (C), and a plurality of diodes (D). Negative feedback is used to set the last dynode voltage proportional to a voltage controlled by the gain control voltage delivered by a voltage source such as a digital-to-analog converter. The control circuit (10) of the present invention is connected to the last dynode using a single connecting wire (22)."

Background information for a photomultiplier detector having gain control through change of the bias on at least one of the dynodes, is described and claimed in, U.S. Pat. No. 4,804,891, entitled, "PHOTOMULTIPLIER TUBE WITH GAIN CONTROL," issued Feb. 14, 1989, to Harold E. Sweeney, including the following, "[i]mproved gain control in a photomultiplier tube having a plurality of dynode stages is achieved through manual or automatic change of the bias voltage on at least one of the several dynodes between the anode and cathode of the tube. By such means, maximum tube gain change is obtained with a minimum of bias voltage swing."

Background information for a photomultiplier detector having automatic gain control, is described and claimed in, U.S. Pat. No. 3,614,646, entitled, "PHOTOMULTIPLIER TUBE AGC USING PHOTOEMITTER-SENSOR FRO DYNODE BIASING," issued Oct. 19, 1971, to Earl T. Hansen, including the following, "[a] photomultiplier tube automatic gain control circuit wherein the biasing potentials between a plurality of adjacent dynodes are varied inversely as the amplitude of the photomultiplier output signal. The output signal is detected and applied to a photoemitter-sensor connected in shunt with the biasing network for the aforesaid dynodes."

Accordingly, there is a need in the field of particle detection to improve the operational lifetime for such structures when operated at high gains. The present invention addresses this need, as disclosed herein, by providing a novel intermediate dynode structure and coupled circuit to regulate the gain and thus the intensity of the secondary emission of one or more downstream dynodes near the output of the device no matter high strong of an input signal.

SUMMARY OF THE INVENTION

The present invention is directed to a novel particle detector that includes a cathode that emits electrons in response to receiving incident particles that represent one or more input signals; a plurality of cascaded dynodes configured to provide a sensed current at an anode that is related to the number of received incident particles; an interposed partitioned dynode arranged as part of the plurality of cascaded dynodes to provide a detection current indicative of the magnitude of the one or more input signals; and a control circuit coupled to one or more downstream dynodes within the plurality of cascade dynodes and configured to receive the detection current so as to regulate the voltage gain to the one or more downstream dynodes upon the detection current being above a predetermined threshold.

Accordingly, the present invention provides for an apparatus and method of operation that enables a user to prevent high current pulses (beyond the capacity of a dynode capacitor combination) to hit the dynodes. In particular, the methods, electron multiplier structures, and coupled control circuits of the present invention enable a resultant on the fly control signal to be generated upon receiving a predetermined threshold detection signal so as to enable the voltage regulation of one or more downstream dynodes near the output of the device.

DETAILED DESCRIPTION

Figure 1B:
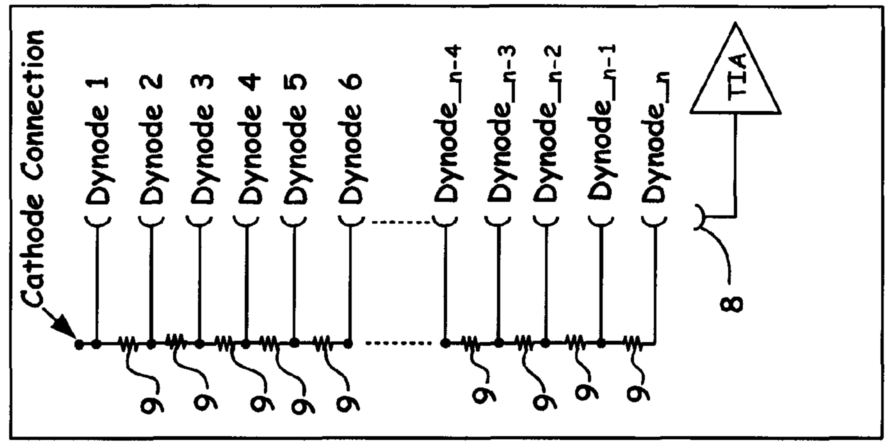
FIG. 1B shows the dynode arrangement with an example coupled resistive network.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention is directed to a detector design wherein desired dynode structures, often the final dynodes of an electron multiplier detector, are prevented from being subjected to high current pulses even in the event of high input signals. To enable such a result, a detection signal, as disclosed herein, is provided by a modified intermediate dynode that enables a coupled regulating circuit to adjust the gain to the one or more downstream dynodes.

The surface area of the novel intermediate dynode within the cascaded ladder of dynodes has its surface emitting area partitioned such that electron current impacts the partitioned areas in the ratio of about 50%-50% up to about a ratio of 95%-5%, more often in a ratio of about 90%-10%. Electrons hitting the equal or larger area are allowed to propagate in a normal mode, i.e., from dynode to dynode, while those hitting the remaining equal or smaller area provides the current to be evaluated by a coupled regulating control circuit.

The coupled regulating circuit can simultaneously in real time evaluate the provided for current (i.e., the detection signal) from the intermediate dynode and if the measured current exceeds a predetermined threshold, it can generate a desired corresponding control signal. In particular, the resultant detection signal provided from an intermediate dynode is utilized in a time constrained fashion to enable a regulating control circuit to switch the gain voltage on one or more dynodes adjacent to the anode. The important criteria is that such a detection signal (a current signal) if above a predetermined threshold value and the corresponding switching aspect (i.e., the control signal) is properly administered to the desired dynode(s) before the arrival of the normally propagating electron current that is moving along the longer electron pathway (i.e., from dynode to dynode). Accordingly, the configuration and method of the present invention in a novel fashion can dynamically drop the gain at the desired dynode(s) so as to prevent unnecessary current amplification that if left unchecked can contribute to, for example, undesirable contamination effects.

Specific Description

The Detector

Figure 1A:
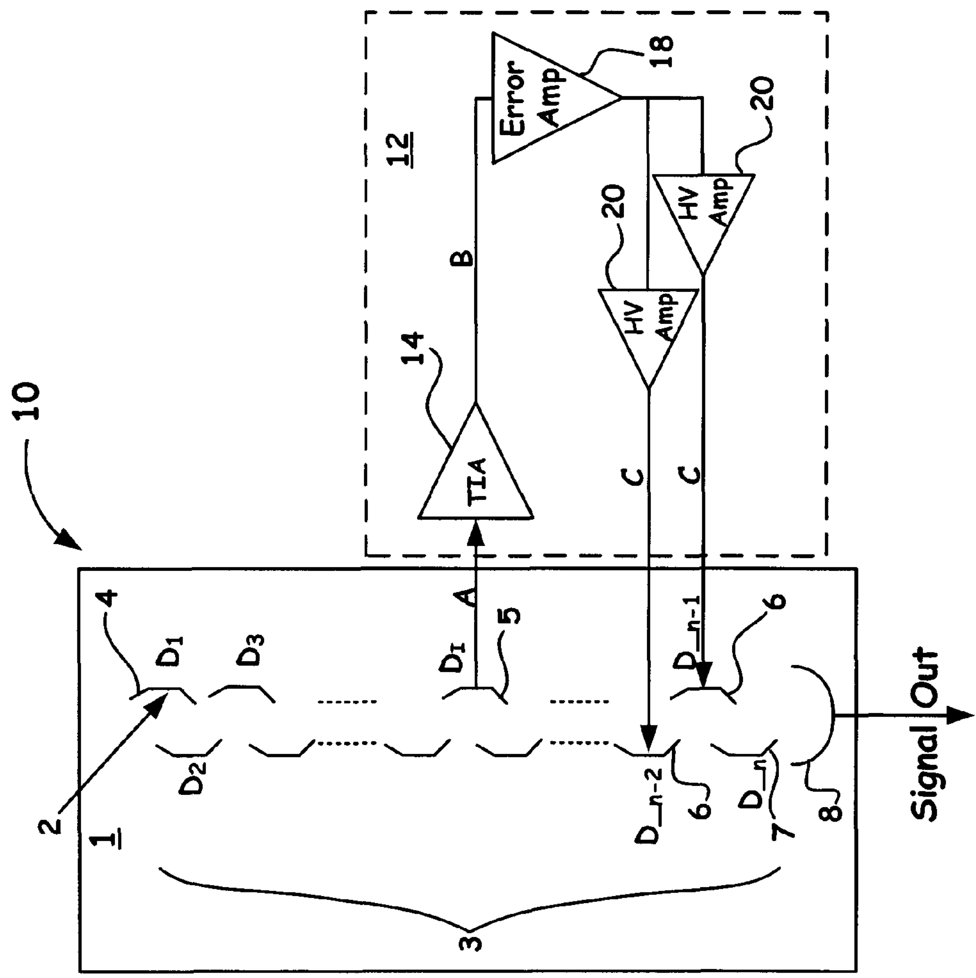
FIG. 1A shows a beneficial example detector of the present invention.

FIG. 1A shows a basic non-limiting beneficial example embodiment of a discrete dynode detector, generally designated by the reference numeral 10 that can be used with the methods of the present invention. It is to be understood that the detector described herein is capable of detecting particles selected from photons, neutral molecules, as well as ions provided by any mass spectrometer instrument that can provide an ion path to be received by the detector of the present invention. Example detectors include photomultipliers and discreet dynode instruments. Example mass spectrometer instruments are to include, but are not limited to time of flight instruments (TOFs), and quadrupole electrode devices (e.g., ion traps).

In general, FIG. 1A shows a detector 10 that comprises an electron multiplier section 1 (as shown in the solid rectangular box) that further includes a plurality of cascaded dynodes 3, a novel intermediate detection dynode 5 to provide a detection signal (current), and a coupled control circuit 12 (shown enclosed in a dashed box) configured to regulate one or more downstream dynodes 6 (e.g., $D_{—n-1}$ and $D_{—n-2}$), which can include the last dynode 7 ($D_{—n}$) in the chain, that make up the plurality of cascaded dynodes 3.

As is known by those skilled in the art, discrete dynode multipliers, such as exemplified by the detector of FIG. 1A, operate on the principle of secondary electron emission. The greater the number of dynodes, the longer the overall normal propagating pathway as well as a greater gain because each dynode increases the number of multiplied electrons moving along a path from dynode to dynode. As shown in the example embodiment of FIG. 1A, the plurality of dynodes, generally designated by the reference numeral 1 includes two rows of dynodes, which rows extend generally but not necessarily parallel to each other from an input end (i.e., as generally provided at dynode D1 4) to an output collector anode end 8 to provide a desired sensed signal indicative of one or more inputs signals. It is to be understood that the number of dynodes (electrodes) of the present invention can vary from about 13 up to about 40 dynodes in the detector 10 arrangement as long as the overall gain is adequate to provide the requisite signal to noise ratio and as long as the chosen intermediate dynode(s) can provide a necessary sensing current with a spatial separation from the desired downstream dynode(s) to allow time to dynamically regulate the voltages of the detector 10 when appropriate.

To illustrate operability of the detector 10 shown in FIG. 1A, the dynode electron multiplier 1, as part of the detector 10, often has a coupled negative high voltage to the cathode (not shown) with respect to the collector 8 (anode), which as one arrangement can be biased at ground. The plurality of dynodes collectively shown by the reference numeral 3 and also denoted as $D_1$, $D_2$, $D_3$, $D_I$, etc., are thus configured as a series of dynodes with coupled progressively increasing positive voltages as provided by, for example, a biasing resistive network 9, as shown in FIG. 1B in addition to other discrete devices (not shown) known in the art, e.g., capacitors, zener diodes, etc., that enable the predetermined voltages to be applied between pairs of such dynodes 3 in a controlled fashion to thereby enable an overall gain.

FIG. 1B thus shows an example arrangement of a plurality of resistive elements 9, that in operation comprise a voltage divider circuit for the plurality of dynodes (denoted as Dynode 1, 2, n, etc.), as also shown in the corresponding dynode arrangement 1 of FIG. 1A. As another arrangement, the resistive elements 9 may be replaced with a variable resistor to also adjust the voltages between desired pairs of dynodes 3. Moreover, such resistive elements 9 can be configured as a monolithic thick-film resistor chain specifically designed for a desired application to achieve the best dynamic range and lifetime for the detector 10. In addition, the aforementioned capacitors (not shown) can be coupled in parallel to the resistive network (resistive elements 9) in a known manner so as to prevent, as one application, unwanted voltage changes to any of the dynode pairs (e.g., between $D_1$ and $D_2$) during operation. Moreover, utilized zener dynodes can be implemented to clamp desired voltages to any of the dynode pairs, more often dynodes near the anode 8 so as to protect the detector 10 from voltage spikes.

Turning back exclusively to FIG. 1A, a user in operation of the detector 10 can first enable one or more particles 2 indicative of an input signal to be received by the first dynode 4 (also denoted as $D_1$) of the plurality of dynodes 3. The impact of the particle(s) 2 with the first dynode (D1) 4 thus causes the emission of secondary electrons with the gain determined by the gain coefficient and the voltage of the cathode (not shown) that precedes it. As the secondary electrons reach subsequent dynodes, the amount of secondary emission (i.e., the gain) and thus the corresponding current increases from dynode to dynode with an overall sensed current (I) at the anode 8 determined by Equation 1:

$$I=qNG; \quad (1)$$

wherein q is the charge on an electron, N is the number of particles (e.g., ions) per second being detected, and G is the gain of the multiplier.

Thus the current, using ions provided by a mass spectrometer as an example, is directly related to the number of received ions detected as well as the overall operating gain of the detector 10. However, the dynodes at the end of the chain 6, e.g., $D_{—n-1}$ and $D_{—n-2}$, in normal operation are impacted with the higher levels of current based on the architecture of the dynode assembly 1. To prevent such dynodes near the output anode 8 from being hit with high current pulses as enabled by an input signal, the present invention provides for an intermediate dynode 5 (also denoted as $D_I$) modified to provide a current detection signal so as to be utilized to adjust the gain of one or more downstream dynodes 6, e.g., $D_{—n-1}$ and $D_{—n-2}$. Specifically, by utilizing an intermediate dynode 5 to provide a sampled current related to the input signal, such a detection signal can be utilized to regulate in real-time the gain to those downstream dynodes that can be impacted with high amounts of current if the sampled detection current is above a predetermined threshold limit.

It is to be first appreciated that the majority of configured dynodes 3 in addition to the modified intermediate dynode 5 of the present invention can be configured as a system of rings, venetian blind-like structures, plates, curved or planar structures that are often interlaced electrodes so as to receive and direct a desired electron bundle. Moreover, the electrodes (i.e., dynodes) themselves can be configured with surface areas that comprise spherical structures, cylindrical structures, meshes, planar or curved strips of metal structures, polished structures, and/or removable emissive surfaces coupled to a base material. In addition, the dynode emissive surfaces of the dynodes may be enhanced as understood by those of skill in the art by surface treatment from beryllium-copper or silver-magnesium material or beneficial aluminum containing materials, such as aluminum oxide ($Al_2O_3$), which has been shown to be air stable and substantially resistant to corrosive atmospheres to result in very robust electrodes.

In whatever beneficial shape that is chosen for the intermediate dynode 5 of the present invention, such a novel intermediate detection dynode is beneficially partitioned (e.g., splitting the receiving area of the intermediate dynode into sections) so as to result in an often unequal partitioned surface emission area in a ratio of about 95%-5%, more often in a ratio of about 90%-10%. Electrons hitting, for example, the larger area are thus allowed to propagate in a normal mode, i.e., from dynode to dynode, while those hitting the remaining smaller area provides for a sampling detection signal current to be evaluated by the coupled regulating control circuit 12, as shown in FIG. 1A. It is also to be appreciated that while a single partitioned electrode is often desired, other beneficial configurations, such as interstitial designs, i.e., electrodes having an empty space or gap between conductive areas that include mesh electrodes, can also be integrated as part of the intermediate dynode when configured with other aspects of the present invention. For example, the mesh grid itself can configured at a first potential to receive and direct electrons to propagate in a normal fashion while an adjacently coupled electrode and at a different potential from the mesh electrode receives those electrons that are directed through the mesh to provide for the detection current as described herein. In any configuration, the intermediate dynode 5, as shown in FIG. 1A, is interposed within the chain of dynodes 3 to detect a prescribed partitioned current that is indicative of the one or more input signals. The detection signal in such a novel configuration can thus be beneficially received (denoted by the letter A and accompanying directional arrow) by a control circuit 12 (as shown within the dashed box of FIG. 1A) using any configuration of discreet device architecture that is well known in the electronic arts.

As a non-limiting general example of the control circuitry 12 illustrated in FIG. 1A, the detection current signal A can be first received and converted by any simple current-to-voltage converter, such as, an example trans-impedance amplifier 14 shown in FIG. 1A. Thereafter, the converted voltage signal can be directed (as denoted along line B) into a unidirectional voltage control circuit (e.g., an error amplifier 18) wherein the output voltage is compared to a stable reference threshold voltage. Any difference between the two generates a compensating error voltage which tends to move the output voltage (denoted along lines C shown with accompanying directional arrows) from amplifiers 20 towards the design specification as to regulate the gain of one or more downstream dynodes 6, e.g., $D_{—n-1}$ and $D_{—n-2}$ so as to if required, minimize unnecessary intense electron currents. While the regulating circuit 12 shown in FIG. 1A and as described herein is shown coupled to the intermediate positioned dynode 5 (denoted as $D_I$), it is to be understood that such a regulating circuit 12 of the present invention can be coupled to any selected dynode 3 that is capable of being modified and arranged in the chain of dynodes when meeting the specifications described herein.

It is to also be appreciated that the choice of location of the predetermined intermediate modified dynode is a compromise between the sensitivity and available slew rate of the control circuit 12 of FIG. 1A as discussed below. Detecting upward in the dynode ladder provides a lower current through the 5% up to about 50%, more often the 10% electrically coupled pick-off portion of the chosen electrode area with the tradeoff being that a detection signal provided earlier enables more time to switch the voltage on the regulated dynode structure that is as close as possible to the output.

In particular, it would be beneficial to regulate the voltage on the dynode that is as close as possible to the output (e.g., a dynode 6, 7 adjacent the anode 8 of FIG. 1A). Such an arrangement can enable high sensitivity of the current sensing partition (area for current sensing can be reduced) with the limitation being the travel time of electrons and the speed of the control circuit 12.

Table 1 shown below is an illustrative resultant spreadsheet of a non-limiting example circuit model configuration, similar to that shown in FIG. 1A, listing possible operating parameters and thus design considerations so as to illustrate the novelty of the present invention. The listed operating parameters for this example are obtained from an example electron multiplier detector arranged with 25 dynodes, a total gain of about $10^6$, a coupled example capacitance measured at the $25^{th}$ dynode being at about 370 pF, and an acceleration field between any two dynodes being about 70 volts. Using such constraints, column 1 of Table 1 shows the dynode # (i.e., the possible detection dynode), column 2 shows the available current from the respective dynode when configured with a 10% current partition, column 3 shows the distance from dynode to dynode as well as the overall path-length for the electron travel to the last dynode, column 4 shows the response time to change the gain of the $25^{th}$ dynode if a particular dynode is utilized to provide the detection signal, column 5 shows the current out, and column 6 shows the slew rate (kV/μs) required to switch the $25^{th}$ dynode.

TABLE 1

| Detection Dynode | Available Current | Distance of Detection Dynode To Last Dynode (mm) | Response Time (sec) | Current Out (Amps) | Slew Rate (kV/μs) |
|---|---|---|---|---|---|
| 25 | 1.00E−04 | 0 | 0 | — | INF |
| 24 | 5.76E−05 | 10 | 2.01613E−09 | 5.5056 | 14.88 |
| 23 | 3.31E−05 | 20 | 4.03226E−09 | 2.7528 | 7.44 |
| 22 | 1.91E−05 | 30 | 6.04839E−09 | 1.8352 | 4.96 |
| 21 | 1.10E−05 | 40 | 8.06452E−09 | 1.3764 | 3.72 |
| 20 | 6.32E−06 | 50 | 1.00806E−08 | 1.10112 | 2.976 |
| 19 | 3.64E−06 | 60 | 1.20968E−08 | 0.9176 | 2.48 |
| 18 | 2.10E−06 | 70 | 1.41129E−08 | 0.786514286 | 2.125714286 |
| 17 | 1.21E−06 | 80 | 1.6129E−08 | 0.6882 | 1.86 |
| 16 | 6.95E−07 | 90 | 1.81452E−08 | 0.611733333 | 1.653333333 |
| 15 | 4.00E−07 | 100 | 2.01613E−08 | 0.55056 | 1.488 |
| 14 | 2.30E−07 | 110 | 2.21774E−08 | 0.500509091 | 1.352727273 |
| **13** | **1.33E−07** | **120** | **2.41935E−08** | **0.4588** | **1.24** |
| 12 | 7.63E−08 | 130 | 2.62097E−08 | 0.423507692 | 1.144615385 |
| 11 | 4.39E−08 | 140 | 2.82258E−08 | 0.393257143 | 1.062857143 |
| 10 | 2.53E−08 | 150 | 3.02419E−08 | 0.36704 | 0.992 |
| 9 | 1.46E−08 | 160 | 3.22581E−08 | 0.3441 | 0.93 |
| 8 | 8.38E−09 | 170 | 3.42742E−08 | 0.323858824 | 0.875294118 |

TABLE 1-continued

| Detection Dynode | Available Current | Distance of Detection Dynode To Last Dynode (mm) | Response Time (sec) | Current Out (Amps) | Slew Rate (kV/μs) |
|---|---|---|---|---|---|
| 7 | 4.83E−09 | 180 | 3.62903E−08 | 0.305866667 | 0.826666667 |
| 6 | 2.78E−09 | 190 | 3.83065E−08 | 0.289768421 | 0.783157895 |
| 5 | 1.60E−09 | 200 | 4.03226E−08 | 0.27528 | 0.744 |
| 4 | 9.21E−10 | 210 | 4.23387E−08 | 0.262171429 | 0.708571429 |
| 3 | 5.30E−10 | 220 | 4.43548E−08 | 0.250254545 | 0.676363636 |
| 2 | 3.05E−10 | 230 | 4.6371E−08 | 0.239373913 | 0.646956522 |

To provide an understanding in the formulation of the operating parameters that make up Table 1, Dynode 13 is chosen for illustrative purposes as the detection dynode and thus the operating parameters for the row comprising Dynode 13 is shown bolded for convenience so as to aid in the following discussion.

It is to be appreciated that for this non-limiting example, the detection dynode is half way up in a 25 dynode chain with the circuitous distance to the $25^{th}$ dynode being about 120 mm, as shown in column 3 and as computed using an inter-dynode spacing of 10 mm. First, the acceleration field, as stated above, between any two dynodes for this example is chosen to be about 70 volts so as to result in an electron velocity (i.e., for 70 eV electrons) at about 4.96E06 meters per second (m/s). Thus, knowing the circuitous distance to the last dynode as shown in column 3, and knowing the travel velocity for the signal electrons to be collected at the anode, the computed response time, as shown in column 4 of Table 1, is about 24 nanoseconds (ns). Specific to this example, 24 ns is the critical time for the control circuit 12, of FIG. 1A to provide the $25^{th}$ dynode with a regulating voltage if necessary upon receiving a detection signal from the novel partitioned $13^{th}$ dynode.

Knowing the response time, the output load current to switch the voltage of the $25^{th}$ dynode is given by Equation 2:

$$I=CdV/dt; \tag{2}$$

with C being the coupled capacitance and dV/dt being a slew rate required to switch the voltage at, for example, the $25^{th}$ dynode. Using 370 pF as the example capacitance and the slew rate dV/dt of 30 volts in the computed response time of 24 ns, the resultant current required by the $25^{th}$ dynode is about 0.46 Amperes (A), as shown in column 4 of Table 1 for the $13^{th}$ dynode.

Accordingly, if the $13^{th}$ dynode chosen in this example provides a predetermined saturation threshold current using a 10% value of the available current so as to trigger then the control circuit, the control circuit can then regulate the voltage at the $25^{th}$ dynode via a high voltage power supply (not shown)/operational amplifiers 20, as shown in FIG. 1A, that can provide a slew rate of 1.24 kV/psec, as shown in column 6 of Table 1.

To compute the trigger 10% value of the available current at any intermediate dynode DI, e.g., the $13^{th}$ dynode, one can use Equation 3:

$$I_{Dn}=(G)^{n-1}I_{DI}; \tag{3}$$

with G being the inter-dynode gain, $I_{Dn}$ being the current at the downstream Dynode n, $I_{DI}$ being the available current at an intermediate dynode of the present invention, and n−1 being the number of dynodes that precedes the intermediate dynode.

Using the $13^{th}$ dynode as the example intermediate dynode, Equation 3 becomes Equation 4:

$$I_{D25}=(G)^{12}I_{D13}; \tag{4}$$

which can be rearranged to provide Equation 5:

$$I_{D13}=I_{D25}/(G)^{12}. \tag{5}$$

Note: because the total gain for the 25 dynode chain is given herein as $10^6$, the individual dynode gain $G=(10^6)^{1/25}=1.737$.

Thus, given a known deleterious example saturation current at the $25^{th}$ dynode being about 1 mA, the corresponding threshold current level at the $13^{th}$ dynode, which indicates saturation at the anode is given by solving Equation 5 above to result in:

$$I_{D13}=1\ \text{mA}/(1.737)^{12}=1.3\ \mu\text{A}. \tag{6}$$

Thus, using 10% of the above calculated saturation current for the Error amplifier 18 of the control circuit 12, as shown in FIG. 1A, (e.g., via the 10% partitioned portion of the $13^{th}$ dynode) results in about 130 nA as the available trigger current capable of saturating the anode, as shown in column 2 (i.e., labeled as Available Current) of Table 1. It is this level of current that if sensed for this example, operates to enable (i.e., trigger) the control circuitry 12 of FIG. 1A to regulate the one or more downstream dynodes.

Figure 2:
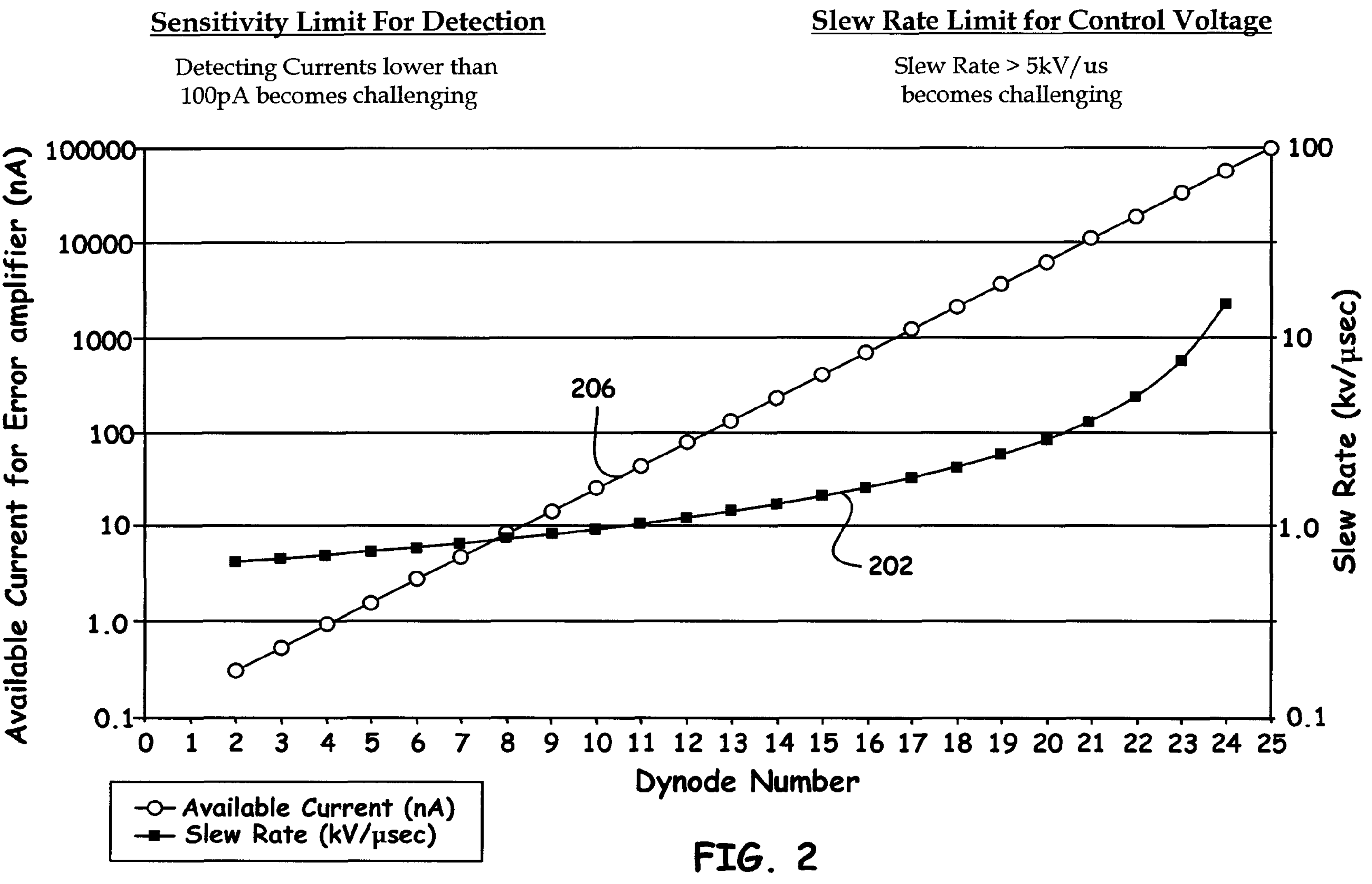
FIG. 2 shows a plot of the available current and slew rate operating parameters from Table 1 when using a 25 dynode electron multiplier design and a 90%-10% partition ratio for the modified intermediate electrode.

The operating parameters for the rest of Table 1 are similarly derived when analyzing a particular intermediate dynode arrangement of the present invention if choosing a 10% partitioned available current value (i.e., by modifying the intermediate dynode with a ratio a ratio of 90%-10%. FIG. 2 shows the results of Table 1 with respect to the slew rate 202 and available current 206 as plotted against the respective dynode number using such constraints. Using an example plot, such as the plot shown in FIG. 2 enables a user of the present invention the capability of optimizing a given configuration by knowing predetermined system limits. As shown labeled at the top of FIG. 2, detecting currents lower than about 100 pA and a slew rate greater than about 5 kV are the sensitivity and slew rate figures of merit for existing discreet hardware. Accordingly, for the example configuration discussed above that provides the operating parameters shown in FIG. 2, the electrodes from dynode 2 up to about dynode number 20 are also capable of being utilized as the modified intermediate detection dynode.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

What is claimed is:

1. A particle detector, comprising:

a cathode that emits electrons in response to receiving incident particles that represent one or more input signals;

a plurality of cascaded dynodes configured to provide a sensed current at an anode that is related to the number of received incident particles;

an interposed dynode arranged as part of said plurality of cascaded dynodes, wherein said interposed dynode comprises partitioned sections to direct received electrons to the remainder of said plurality of cascaded dynodes for further amplification and to further provide a detection current indicative of the magnitude of said one or more input signals; and a control circuit coupled to one or more downstream dynodes within said plurality of cascade dynodes and configured to receive said detection current so as to regulate the voltage gain to said one or more downstream dynodes upon said detection current meeting a predetermined current threshold.

2. The particle detector of claim 1, wherein said interposed partitioned dynode comprises unequal sections.

3. The particle detector of claim 2, wherein said unequal sections comprises a first portion configured to direct received electrons to the remainder of said plurality of cascaded dynodes for further amplification and a second portion to provide said detection current so as to regulate the voltage gain to said one or more downstream dynodes.

4. The particle detector of claim 2, wherein said unequal sections comprises a ratio of 90%-10%, wherein said 90% portion is configured to direct received electrons to the remainder of said plurality of cascaded dynodes for further amplification and said 10% is configured to provide said detection current so as to regulate the voltage gain to said one or more downstream dynodes.

5. The particle detector of claim 1, wherein said interposed dynode comprises an interstitial electrode configured at a first potential to receive and direct received electrons to the remainder of said plurality of cascaded dynodes for further amplification while an adjacently coupled electrode at a different potential from said mesh electrode receives those electrons that are directed through said interstitial electrode to provide for said detection current.

6. The particle detector of claim 1, wherein said interposed partitioned dynode comprises equal sections that further includes: a first portion configured to direct received electrons to the remainder of said plurality of cascaded dynodes for further amplification and a second portion to provide said detection current so as to regulate the voltage gain to said one or more downstream dynodes.

7. The particle detector of claim 1, wherein said interposed dynode comprises at least one electrode structure selected from: a spherical structure, a cylindrical structure, a mesh structure, a planar structure, and a curved structure.

8. The particle detector of claim 1, wherein said plurality of dynodes comprises from at least 13 dynodes up to about 40 dynodes.

9. The particle detector of claim 1, wherein said downstream dynodes to be regulated are adjacent to said anode.

10. The particle detector of claim 1, wherein said downstream dynodes comprises a slew rate of less than about 5 kV/μs.

11. The particle detector of claim 1, wherein an available detection current provided by said interposed partitioned dynode is at least 100 pA.

12. The particle detector of claim 1, wherein said incident particles comprise at least one of charged particles, neutral particles, and photons.

13. The particle detector of claim 1, wherein said detector comprises a photomultiplier.

14. The particle detector of claim 1, wherein said plurality of cascaded dynodes is coupled to a resistive network.

15. The particle detector of claim 1, wherein said control circuit comprises discreet circuitry configured to provide a control signal prior to the arrival of the propagating amplified electrons directed from dynode to dynode.

16. The particle detector of claim 1, wherein said particle detector can detect particles provided by at least one mass spectrometer instrument selected from: a time of flight instrument (TOF) and a quadrupole electrode device.

* * * * *